G. KING.
Apparatus for Tanning Hides and Skins.
No. 218,539. Patented Aug. 12, 1879.
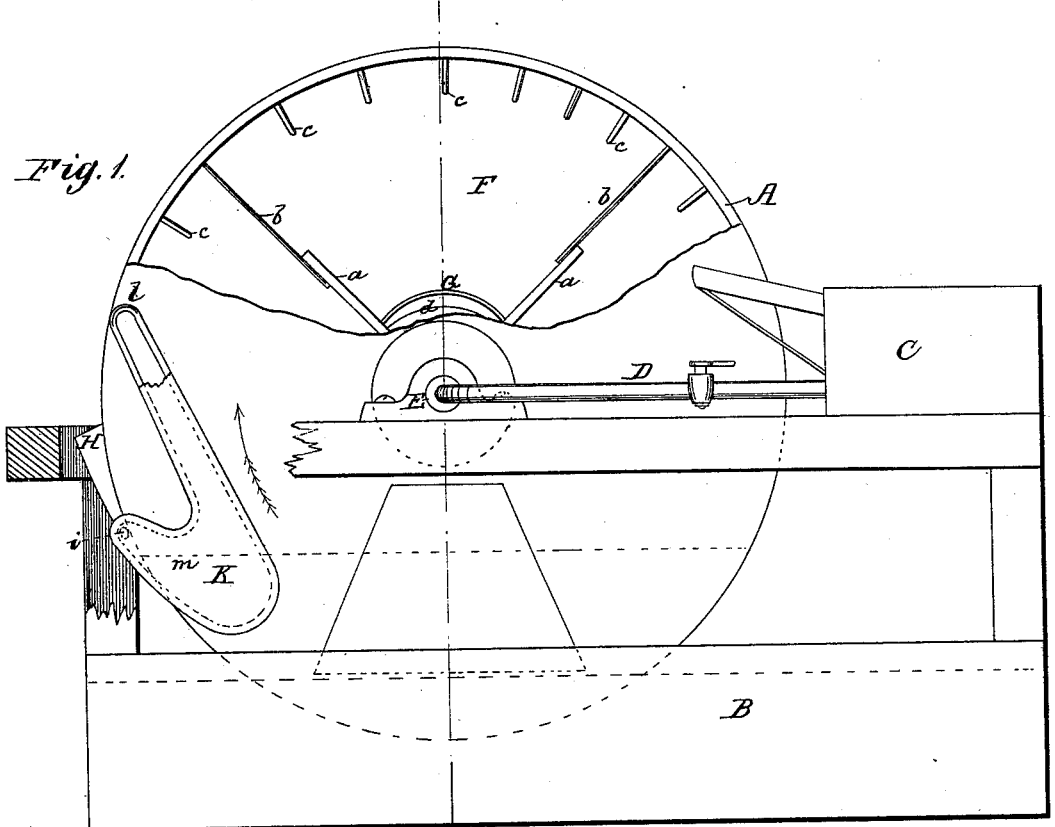
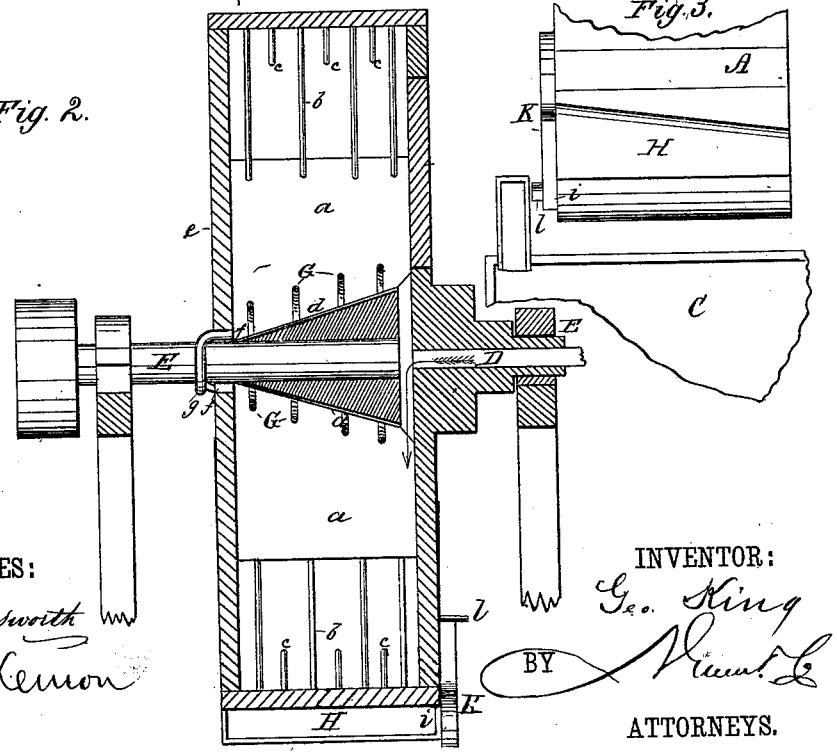

UNITED STATES PATENT OFFICE.

GEORGE KING, OF WASHINGTON, DISTRICT OF COLUMBIA.

IMPROVEMENT IN APPARATUS FOR TANNING HIDES AND SKINS.

Specification forming part of Letters Patent No. 218,539, dated August 12, 1879; application filed June 11, 1879.

*To all whom it may concern:*

Be it known that I, GEORGE KING, of Washington city, District of Columbia, have invented a new and Improved Apparatus for Tanning Hides and Skins; and I do hereby declare that the following is a full, clear, and exact description of the same.

My process is an improvement on what is known as the "slow." or bark tanning process; and its chief feature consists in alternately subjecting the skins or hides to the action of fresh tanning-liquor, then raising them out of the same and allowing the liquor to drip or drain off, and, lastly, conducting that portion of the drained liquor which was last in contact with the hides back into the leach to be again passed through the bark, and thus strengthened by taking up an additional quantity of the astringent principle or tanning agent.

My apparatus is a closed rotating drum, in whose several compartments the hides are placed, and into which the tanning-liquor is constantly fed, and from which it is being constantly withdrawn when its strength has become partly exhausted.

Said apparatus is illustrated in accompanying drawings, in which—

Figure 1 is a partial side elevation of the same, part being broken away. Fig. 2 is a vertical central section of the rotating drum. Fig. 3 is a detail plan view.

The chief elements of the apparatus are the rotating drum A, vat or tub B, and leach C.

The tan-liquor flows from leach C into drum A through pipe D, and, as the drum revolves, the skins or hides contained therein are submerged in the liquor, and as they rise out of it a portion of the liquor drained from them passes out into the vat B, from which it is taken up by buckets H attached to the drum, and thus returned to the leach C. The latter may be constructed and filled with bark in the usual manner. It is so placed with reference to the drum that the bark-liquor will flow from the leach into the drum through a pipe or tube, D, which may be flexible or rigid, and provided with a stop-cock or other device for regulating the flow of the liquor as required. Said tube D enters the hollow axis E of the drum A, and discharges the tanning-liquor downward at a point contiguous to the side thereof.

The drum is a narrow cylinder having a series of segmental compartments, F, for receiving the hides to be tanned. Each compartment is provided with a lateral door and formed by radial partitions, which have an imperforate inner portion, $a$, and open-work outer portion, $b$. A series of pins, $c$, also project inwardly from the periphery of the drum.

The narrow bottoms or inner ends, $d$, of the compartment F are inclined to the left or opposite side, $e$, of the drum from that through which the pipe D enters, and an opening is formed at $f$ in said left side of the drum to allow discharge of the liquor which drains from the hides during a part of the revolution of the drum, as hereinafter described.

In order to prevent the hides coming in contact with the bottoms $d$ of each compartment F, and thereby obstructing the escape of the drain-liquor, I provide wooden guards or an open-work arch, G, as shown in Figs. 1, 2.

The flow of tan-liquor from the leach C, through pipe D, keeps the liquor in the drum A at a depth of about half its radius, so that as the drum revolves the hides are carried around with it and submerged in the liquor, and then raised out of it, the liquor, of course, keeping place in the bottom of the drum.

The pins $c$ keep the skins away from the periphery of the drum, so that the liquor has free access to them, and the skins also catch on the pins as the drum rotates, and are thus carried up and allowed to fall on the bottom $d$ of the compartments, which operation tends to force the liquor out of the pores and increases the suppleness of the skins.

The liquor which first drains from the hides as they rise out of the main body of the liquor flows back and mingles with such main body; but when the drum has rotated far enough to cause the hides to fall inward toward the axis of the drum, and thus rest on the guards G and imperforate sides $a$ of the compartment, the backward escape of the drip or liquor drained from the hides is cut off, and it is caused to flow out of the opening $f$ in the side $e$ of the drum, and is discharged free of the axis E, by curved tubes $g$, into the vat B. This portion of the liquor which is thus carried off into vat B is weaker, or contains less of the astringent tanning agent, than that which remains in the bottom of the drum, since it is the portion which filled the pores of the hides, or was in more immediate contact with their surfaces.

In order to restore the strength of the liquor thus abstracted and collected in the vat B, I provide the following-described means for reconveying it to the leach C: Said means consist of a bucket, H, attached to the periphery of the drum, and having an opening, $i$, on the side next the leach and a lateral receptacle, K, which is attached to the same side of the drum and provided with a spout, $l$.

There may be any number of such buckets and side receptacles, and the latter may have simply a flaring mouth in place of the bucket attachment.

As the drum revolves each bucket will take up a quantity of the spent liquor, which will escape into the enlarged portion of the receptacle K, Fig. 1, and as the rotation of the drum continues the liquor contained in the receptacle will flow toward the smaller end of the latter, Fig. 3, and be discharged therefrom by the lateral spout $l$ into leach C. In this manner the spent liquor will be restored to the leach, where, being reabsorbed by the bark, it will regain its former strength before again passing through the tube D to act on the hides, as before.

Another important effect of passing the liquor through the bark is, that it removes from it whatever filth and putrescent animal matter it may have taken or carried away from the hides.

By this process the hides are continually subjected to the action of fresh liquor, and are hence more quickly tanned than by the old method, and with far less labor and expense.

The handling of the hides by the continuous motion of the drum also renders them softer and more supple than they would otherwise become, and aids in opening the pores.

The ultimate result is the production of a better quality of leather in a shorter time, and at less cost, than heretofore.

The drum may be rotated by any suitable agent or device.

While I prefer, I do not restrict myself to, the use of the devices shown and described for reconveying the tanning-liquor to the leach, since ordinary mechanical skill is adequate to devise and employ various other instrumentalities or appliances for the purpose.

I do not claim, broadly, the method of renewing the strength of tanning-liquor by producing a circulation of the liquor from a tan-vat back to a leach, and from the leach to the vat again; but I believe I am the first to reconvey to the leach the spent liquor alone—that is, the spent liquor unmingled with the liquor in the vat, which is still of good strength.

What I claim is—

1. The combination, substantially as described, of the leach and its conducting-tube, the drum having compartments for receiving the hides, and in which they are allowed or caused to shift position as the drum rotates, the lateral openings or passages for escape of the spent liquor which drains from the hides, a vat or receptacle for the spent tan-liquor, and means for elevating and reconveying the same to the leach.

2. The combination of the leach, conducting-tube, and a rotating closed drum having one or more compartments to receive the hides, and provided with lateral discharge-openings, substantially as shown and described.

3. The combination, substantially as specified, of a leach, a conducting-tube, a rotating closed drum having one or more compartments to receive the hides, and each compartment being provided with a lateral opening, the vat for receiving the partly-spent liquor, and devices, substantially as described, for reconveying the latter to the leach.

4. The combination of the leach, the conducting-tube, the rotating closed drum, the several compartments thereof having partitions which are imperforate in one part and perforated or open-work in the outer part, discharge-openings in the side of the drum at the bottom of the compartments, a vat or spent-liquor receptacle, and the buckets and lateral receptacles attached to the periphery and side of the drum respectively, all as shown and described.

5. The rotating closed drum provided with openings around and concentric with the axis, and having radial partitions whose inner halves are imperforate and their outer portions perforated, substantially as shown and described, whereby, as the drum revolves, a portion of the tanning-liquor adhering to the hides escapes downward as the hides are raised, and a portion is collected and discharged laterally through said openings, as specified.

6. The combination of the rotating drum, buckets, side receptacles, vat, and leach, as shown and described.

7. The combination of the drum having lateral openings and the bottoms inclined toward said openings, as specified.

8. The combination of the curved tubes with the axis of the drum and compartments thereof and the vat, as shown and described.

9. In a tanning apparatus, the combination, with the vat, leach, and rotating drum, of the receptacles and buckets attached respectively to the side and periphery of the latter, and the spout attached to the smaller end of said receptacles, as shown and described.

The above specification of my invention signed by me this 11th day of June, 1879.

GEORGE KING.

Witnesses:
AMOS W. HART,
SOLON C. KEMON.